United States Patent Office 3,466,266
Patented Sept. 9, 1969

3,466,266
RESINOUS COMPOSITIONS AND METHOD FOR PRODUCTION THEREOF
Nobuyoshi Nagata, Hirakata-shi, and Shu Taniguchi, Minoo-shi, Japan, assignors to Nippon Paint Co., Ltd., Oyodo-ku, Osaka, Japan, a corporation of Japan
No Drawing. Continuation of application Ser. No. 478,411, Aug. 9, 1965. This application Dec. 16, 1968, Ser. No. 786,820
Claims priority, application Japan, Aug. 11, 1964, 39/44,708, 39/44,709
Int. Cl. C08f 15/40
U.S. Cl. 260—78.5   12 Claims

ABSTRACT OF THE DISCLOSURE

This invention relates to a method for producing a novel copolymer solution which is stable at room temperature and is readily cured by baking. More particularly, the invention pertains to a novel copolymer solution prepared, in the methylolation reaction of an amide or amino group-containing copolymer, by adding to the reatcion system no or a little alcohol, i.e., less than 6 moles, preferably less than 1.5 moles, per amide group in the reaction system, reacting monoaldehyde with the copolymer in the presence of a basic catalyst under such conditions that said copolymer is characterized by having at least about 50% of the amide or amino groups thereof having a hydrogen atom replaced by the structure

—CH$_2$OH and, if necessary, using together with an acid catalyst during or after the reaction.

The copolymer solutions obtained in accordance with the present invention are applied to coating materials, adhesives, fiber-treating agents and impregnants to give products high in weather and light resistance and excellent in physicochemical properties.

---

This application is a continuation of application Ser. No. 478, 411, filed Aug. 9, 1965, and now abandoned.

One of the most typical examples of amide or amino group-containing ethylenically unsaturated compound is acrylamide. Conventionally, however, it has been very difficult to impart to reaction products obtained by methylolating with monoaldehyde the amide groups of copolymers, in which unsaturated amides of the above kind are employed, the two properties of being stable at room temperature for a long period and of being readily cured by baking. In each of Japanese patent publications Nos. 7,642/62 and 4,678/63, for example, a substantially water-insoluble copolymer comprising about 5–50% by weight of α,β ethylenically unsaturated amide such as acrylamide and 50–95% by weight of one or more other monomers containing one terminal

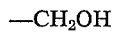

group is reacted in the presence of alkanol with monoaldehyde in an amount of 0.2–3.0 equivalent per amide group in said copolymer, and the reaction is conducted under such etherification conditions that said copolymer is characterized by having at least about 50% of the amide groups thereof having a hydrogen atom replaced by the structure —ROR$_1$, wherein R and R$_1$ are alkyllene and alkyl groups derived from the monoaldehyde and alkanol, respectively. In the above patent publications, acid catalysts are mostly used and recommended, in particular, as the catalysts for the methylolation reaction. Further, the publications show in the examples that, in the above case, if the amount of hydrogen atoms of the amide groups in the copolymer product is less than 50%, the product is deteriorated in storage stability at room temperature. It is therefore inferred that the copolymer obtained might be stable at room temperature and might be slightly serviceable in improving compatibility with dipophilic substances, but it is impossible to expect such properties that, by heating, the ROR$_1$ group is easily decomposed into methylol group and alcohol to make the copolymer thermosetting. If said properties are relied upon the cross-linking reaction between the remaining methylol groups, the absolute amount of methylol groups for cross-linking is too small with the result that the cured product is deteriorated in ability. In other words, the copolymer can display its inherent efficiency by effecting high temperature heating for a long period but, by low temperature heating, the desired efficiency is difficulty expected even when the copolymer is treated for a long period of time. Further, we applied for patent before, a thermosetting composition having the aforesaid 2 required properties which is obtained by reacting a copolymer prepared by using as one component an unsaturated amide, such as acrylamide, with formaldehyde in the presence of a basic catalyst and adding alcohol and acid catalyst to the reaction product. In said patent application, alcohol is required because, due to the addition of acid catalyst, the mixture system becomes acidic and the storage stability of the product at room temperature cannot be ensured. In the references cited above, the former employs alcohol in the form combined with the copolymer, while the latter in a free form together with an acid catalyst. Thus, in every case, alcohol is used as a required component for the maintenance of the storage stability of copolymer solution at room temperature.

In accordance with the method of the present invention, the desired copolymer solutions can be obtained without using alcohol as a required component in some cases. This is a characteristic of the present invention which is not seen in the references. The drawbacks of the above references in which alcohol is used as a required component may be summarized as follows:

(a) Under treating conditions of about 100°–140° C. for about 60–30 minutes, which are required for low temperature heating, said —ROR$_1$ group is difficultly decomposed to methylol group and alcohol.

(b) In case free alcohol remains in an acidic state in the mixture system during storage or during the heat curing step, the etherification reaction of methylol group and alcohol tends to occur prior to the cross-linking reaction between methylol groups of the copolymers, with the result that the cross-linking reaction between the copolymers is disturbed as much. There has therefore been strongly desired the produtcion of a copolymer solution which contains no alcohol in order to facilitate cross-linking during the steps of low temperature heating as well as to increase the absolute amount of cross-linking, or which, even when it contains alcohol, is so considered as to have little influence on cross-linking, without inpuring the storage stability of the solution for a long period of time.

The object of the present invention is to provide such novel copolymer solutions which are highly stable in spite of their having a large number of methylol groups, as well as to provide a method for producing the same. Copolymer solutions which thoroughly satisfy the abovementioned desire can be obtained according to the method of the present invention set forth hereinbelow:

A method for producing a novel copolymer solution which is stable at room temperature and easily becomes thermosetting by low temperature heating, comprising reacting a copolymer composed of 1–30% by weight of an amide or amino group—containing ethylenically unsaturated compound, 0–30% by weight of an α,β- ethylenically unsaturated acid or its anhydride, and 40–99% by weight of at least one monomer polymerizable therewith with about 0.5–3.0% equivalent per amide or amino group in the copolymer, said reaction being carried out in a solvent entirely free from alcohol or containing alcohol as little as possible, i.e. less than 6 moles, preferably less than 1.5 moles, per amide group in the reaction system and being effected in the presence of a basic catalyst, under such conditions that said copolymer characterized by having at least about 50% of the amide groups thereof having a hydrogen atom replaced by the structure —$CH_2OH$, and, if necessary, using together with an acid catalyst during or after the reaction. The copolymers obtained in accordance with the present invention are not limited to those which are substantially water-insoluble but include water soluble copolymers obtained by subjecting copolymers prepared by the copolymerization of 5–30% by weight based on the total monomers of $\alpha,\beta$-ethylenically unsaturated acid or its anhydride to reaction with alkaline substances or amines. The alkaline substances and amines used in the above are also available as basic catalysts for the methylolation reaction. Water-soluble copolymer solutions obtained by methylolation of said water-soluble copolymers according to the above production process are novel as well.

A great characteristic of the present invention resides in that the desired copolymer solution is obtained according to the methylolation reaction in which alcohol is not used at all or is used in an amount as small as possible. A further characteristic of the invention lies in that, under the aforesaid conditions, not only an acid catalyst is employed but a basic catalyst is used in combination therewith according to the prescription shown later.

It is well known that, in reacting the amide group in a copolymer with formaldehyde, an acid catalyst or basic catalyst is ordinarily used in an amount of about 3% by weight based on the copolymer.

When an acid catalyst is used, the condensation reaction between methylol groups occurs simultaneously with the methylolation reaction, and therefore the copolymerization is effected in an alcohol solvent, in most cases. The reason therefor is such that, when the copolymerization is carried out in an alcohol solvent, the reaction of alcohol with methylol group takes place at a stage before the condensation reaction between methylol groups, whereby the product can be prevented from gelling. It is presumed that, in Japanese patent publication Nos. 7,642/62 and 4,678/63, which have been raised as the references before, there have been confirmed from experimental data that, in order to prevent the product from gelling even after storage at room temperature, at least 50% of reacted amide groups should react with alcohol. This relationship is a required condition for the storage stability of the product at room temperature independent of the kind of catalyst employed, i.e. regardless of whether the catalyst is acidic or basic.

When a basic catalyst is used alone, the methylolation reaction takes place but the condensation reaction between methylol groups difficulty occurs, and no curing is attained by low temperature heating. Therefore, in case a basic catalyst is employed, an acid catalyst should be added in combination therewith either during or after the methylolation reaction. The addition during the methylolation reaction involves (1) the case where the amide or amino group—containing copolymer contains as one component an $\alpha,\beta$-ethylenically unsaturated acid or its anhydride and comprises in itself an acidic substance having catalyst action. No further addition of acid catalyst is necessarily required in case, in order to obtain a water-soluble copolymer, in particular, an $\alpha,\beta$-ethylenically unsaturated acid or its anhydride, even when used in excess, is neutralized with a volatile alkaline substance such as ammonia or ammonium hydroxide, for example. Further, the addition during the methylolation reaction involves (2) the case where an acidic substance or a synthetic resin (including a polymerized resin) containing a carboxyl group or acid anhydride is used. For the addition after the methylolation reaction, the above-mentioned case (2) is adopted.

The fact that, in a methylolation reaction carried out in the presence of a basic catalyst and an acidic substance, no gelation occurs in case the basic catalyst is used in excess of the acidic substance to form a salt thereof and the methylolation reaction is effected in a buffer solution containing an excess of free basic catalyst is illustrated in "Thermosetting Vinyl and Acrylic Copolymers" [D. P. Kerry, G. J. H. Melrose et al., J. Appl. Poly. Sci., vol. 7, 1991–2002 (1963)]. However, the above reference fails to describe the use of alcohol as a solvent for methylolation reaction, and the examples thereof show the cases where alcohol is used in a considerably excess amount based on the amide group of copolymer. We confirmed according to chemical analysis that, in the methylolation reaction of amide group—containing copolymers in the presence of alcohol, there occurs the reaction of the resulting methylol groups with alcohol not only in the case where a basic catalyst is used more than an equivalent of an acid catalyst but also in the case where the former is added in excess of the latter, and have found that the presence of alcohol is not negligible. We have further found that, in the above case, the reaction yield of methylol groups and alcohol increases, in general, with increasing amount of alcohol in proportion to amide or amino groups. At the same time, however, it has been discovered that the reaction rate of methylol groups and alcohol varies depending not only upon the quantitative proportion of alcohol and amide or amino groups but also upon the kind and absolute amount of basic catalyst; the quantitative proportion of basic catalyst and acid catalyst; the kind and means of addition of acid catalyst; and the kind and quantitative relation of other solvents than alcohol, and therefore it is difficult to regulate the reaction rate of methylol groups and alcohol only from the quantitative proportion of alcohol to amide groups. That monoaldehyde and alcohol form various compounds in a solution containing a basic or acidic substance and alcohol is well known. Thus, the presence of alcohol acts to lower the methylolation reaction rate of monoaldehyde and amide or amino groups. In this respect also, the method of the present invention has such a great characteristic that the methylolation reaction can be effected with high efficiency in a short period of time to increase the methylolation reaction rate, and the stability after reaction can be ensured by the presence of basic catalyst. This is ascribable to the fact that, in accordance with the method of the present invention, the desired object in methylolation reaction is attainable by use of monoaldehyde in a relatively small amount based on amide groups, and, conversely, the use of monoaldehyde more than about 3.0, equivalent per amide group, is not required and is not suitable since the gelation of resin is caused depending upon prescription. Therefore, the fundamental conditions for the production of the present copolymer solution reside in that the reaction system in the methylolation reaction of a copolymer obtained from starting materials at a proportion within the regulated range should be made alkaline as much as possible and that alcohol should not be used or may be used in an amount as small as possible, i.e. up to 6 moles, preferably less than 1.5 moles, per amide group. In the step of methylolation reaction, the smaller the amount of alcohol in the solvent employed, the smaller becomes the amount of water formed by the condensation reaction of methylol groups and alcohol. In case the amount of water is small, no substantial separation of water from the reaction system is required in practice. However, in case the amount of water formed in the reaction system becomes larger and the water remains in the system at the stage for the methylolation reaction of a water-insoluble copolymer, in particular, the control of methylolation reaction becomes difficult or there arises a cause for uneven coating when the product is applied to an iron plate. In such cases, therefore, the separation of water should be effected according to conventional means.

When polymerizable monomers having lipophilic groups are suitably selected and are copolymerized, the resulting copolymer solutions of the present invention show, in practice, considerable solubilities for ordinary organic solvents. Further, when viewed from the standpoint of attaining thermosetting properties by low temperature heating, the method of the present invention achieves the object by use of a minimum amount of amide group—containing monomer. Since the amide or amino group containing ethylenically unsaturated compound is one of the most expensive materials to be used for this kind of copolymers, it may be said that the method of the present invention is reasonable from the economical standpoint, as well.

The copolymer solutions of the present invention can be produced according to bulk or emulsion polymerization process but, in view of their applications, they are prepared, in general, according to solution polymerization process. The method for producing copolymer solutions of the present invention also involves block and graft polymerization processes. The case of solution polymerization will be stated herein.

As the amide or amino group containing ethylenically unsaturated compound usable for the preparation of the copolymer of the present invention, it is possible to employ 1–30% by weight based on the total monomers of an unsaturated amide such as acrylamide, methacrylamide, itaconic acid diamide, fumaric acid diamide or maleic acid monoamide in combination with one or more monomers represented by the following formulas in which the hydrogen atoms of the amino groups of melamine or urea are substituted by polymerizable unsaturated groups:

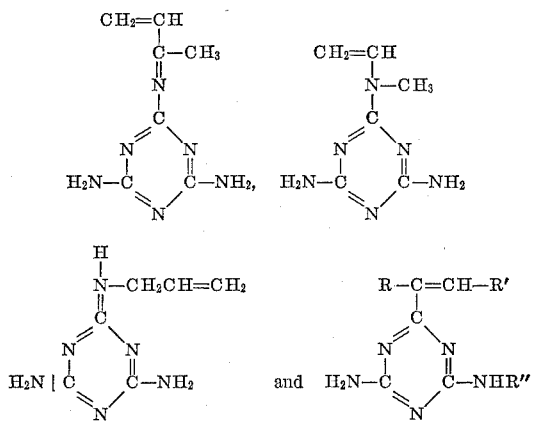

wherein R is H or CH₃— group; and R' and R" individually are H or alkyl group.

However, in case the amount based on the total monomers of the amide group-containing polymerizable monomer is less, the resulting thermally cured product is deteriorated in efficiency, though the methylolation reaction is easily conducted. Therefore, the said monomer is used in an amount of more than 5% by weight.

The $\alpha,\beta$-ethylenically unsaturated acids to be used in the present invention include, for example, acrylic acid, methacrylic acid, crotonic acid, 3-butene, angelica acid, tiglic acid, maleic anhydride, maleic acid and fumaric acid. Copolymer solutions prepared by copolymerizing said unsaturated acids have latent actions as said catalysts for methylolation reaction. When used only as a catalyst, the acid may be employed in an amount of less than 3% based on the total monomers. However, in order to obtain particularly a water-soluble copolymer, one or more of said acids are used as polymerization components in an amount of 10–30% by weight based on the total monomers, and the resulting copolymer becomes water-soluble by neutralization reaction with an alkaline substance such as, for example, ammonium hydroxide, ammonia or aliphatic tertiary amine. In the step of heat curing, a part or all of said alkaline substance or amine escapes and the copolymer becomes acidic to be usable also as an acid catalyst. It is known that the use of said unsaturated acid in small amount improves the adhesivity for materials to be coated.

Another copolymerizable monomer to be used as a modifier for the copolymer includes esters of acrylic and methacrylic acids containing alkyl groups having 1–12 carbon atoms, acrylonitrile, methacrylonitrile, $\alpha$-chloroacrylonitrile, styrene, $\alpha$-methyl styrene, m-chlorostyrene, vinyl acetate, vinyl propionate, vinyl laurate, vinyl chloroacetate, vinyl trimethyl acetate, 1,2-butadiene, 1,3-butadiene, 1,4-pentadiene, 1,4-hexadiene, 2-chloro-1,3-butadiene, allyl chloride, allyl formate, allyl acetate, allyl propionate, allyl alcohol, methallyl alcohol, hydroxyethyl methacrylate, hydroxypropyl methacrylate, hydroxybutyl methacrylate, hydroxyethyl acrylate, hydroxypropyl acrylate, hydroxybutyl acrylate, dimethyl fumarate, diethyl fumarate, dibutyl fumarate, methyl vinyl ketone, ethyl vinyl ketone and methyl isopropenyl ketone.

Polymerization solvent to be used for the solution polymerization includes methyl acetate, dioxane, acetonitrile and acetone. In addition thereto, one or more of toluene, xylene, ethyl acetate, butyl acetate, methyl ethyl ketone, methyl isobutyl ketone and Cellosolve acetate are usable. The use of alcohol should be avoided as far as possible, and it is economical that alcohol is not required to be substituted for other solvent in methylolation reaction. However, in case alcohol is desired to be used in small amount within a permissible range, there may be used a lower alcohol such as methanol, ethanol, propanol or butanol.

Polymerization catalysts, polymerization regulators, monoaldehydes and methylolation reaction catalysts to be used in the present invention will be stated herein below:

As the polymerization catalysts, organic peroxides are employed, in general, but inorganic peroxides are also usable. Benzoyl peroxide has an appropriate decomposition temperature and is easy in handling, and hence is frequently used. In addition thereto, methyl ethyl ketone peroxide, methyl hydroperoxide, hydrogen peroxide, di-tert.-butyl peroxide, peracetic acid and 2,2'-azobis-isobutyronitrile may also be used.

As the polymerization regulators, there are used, in some cases, m-butyl mercaptan, n-dodecyl mercaptan and tert.-butyl mercaptan.

As the monoaldehydes, paraformaldehyde, formalin and formit (a 40% formaldehyde solution in butanol) are used according to ordinary means. In addition to these, acetaldehyde, butylaldehyde and furfural are used with less frequency. It should be noted that monoaldehydes are partially decomposed by elapse of time even at ordinary methylolation reaction temperatures of 60°–120° C. to form acidic substances such as formic acid and the like and act as acid catalysts for methylolation reaction.

As the catalysts for methylolation reaction, there are basic and acid catalysts, respective actions of which are as stated above. As the basic catalysts, aliphatic amines are frequently used. Atypical of those employed ordinarily is triethylamine belonging to aliphatic tertiary amines. It has such characteristics that it makes the mixture system basic when added in small amount and is difficultly vaporized at room temperature but is easily evaporated by low temperature heating to make the mixture system acidic thereby facilitating the cross-linking reaction between copolymers. As compounds similar thereto, there are alkanolamines such as trimethylamine, dimethyl propylamine, dimethyl isopropylamine, dimethyl sec.-butylamine, dimethyl-tert.-butylamine, methyl diethyl-amine, methyl ethyl propylamine, methyl ethyl isopropylamine and dimethyl ethanolamine. Besides these tertiary amines, primary and secondary amines are also used and, in the production of water soluble copolymers, they show catalyst actions as well, making the mixture systems basic with ammonia or ammonium hydroxide, as stated before. However, unlike the tertiary amines, the primary and secondary amines and ammonia are such that their carboxylates react with formaldehyde and tend to give various by-products, and further they are not liable to be restored to carboxylic acids by low temperature heating, whereby the drawbacks of lowering in yield of methylol groups, injury in stability, deterioration in efficiency of cured coatings, and, in the case of water-soluble copolymers, degradation in water solubility, are brought about. Therefore, in case they are used as basic catalysts, it is necessary to avoid the formation of by-products as far as possible to carry out the methylolation reaction effectively by selecting suitably the acid catalysts to be used and by considering the temperature, pH and addition means of formaldehyde. It has been stated before that acid catalysts are employed according to various means. One of the acidic substances having catalyst actions to be used in the present invention is phthalic anhydride. In addition thereto, however, oxalic, malonic, succinic, adipic and phthalic acids are also usable as non-volatile carboxylic acids or acid anhydrides having no polymerizable unsaturated group. Further, the acid catalysts to be added are not necessarily simple substances but may be homopolymers prepared by using α,β-ethylenically unsaturated acids or anhydrides thereof, or may be copolymers having said acid or anhydride as one component. In addition thereto, the acid catalysts may be synthetic resins having acid value and excellent in compatibility. At the time of methylolation reaction and of storage at room temperature, these catalysts do not injure the stability of methylol groups owing to the action of the aforesaid basic catalysts and, at the time of low temperature heating, effectively accelerate the cross-linking reaction between copolymers.

The copolymer solutions obtained in accordance with the present invention may be kneaded or mixed with pigments, inert fillers such as asbestos and glass powder, or natural or synthetic resins (including polymerized resins).

The pigments to be mixed include organic and inorganic color pigments such as, for example, titanium oxide, iron oxide, Hansa Yellow, chrome yellow, Phthalocyamine Blue and carbon black, moisture resistant pigments such as clay, talc, calcium carbonate, silica powder and silica gel, and pigment dispersions prepared so as to be easily dispersible in copolymer solutions such as, for example, Koranil and Pigmosol produced by Hoext Co. of West Germany. These pigments are added in order to color the materials to be coated as well as to improve the adhesivity and corrosion resistance of the resulting coatings on the surfaces of metals.

As the resins, ketone, phenolic, alkyd, urea, benzoguanamine, melamine and epoxy resins, isocyanate compounds, cellulose derivatives such as nitrocellulose, cellulose acetobutyrate and ethyl cellulose, and plasticizers such as dioctyl phthalate, dibutyl phthalate and butyl benzyl phosphite, for example, are used within a range compatible with the copolymers of the present invention.

The following examples illustrate the present invention, but it should be construed that the invention is not limited to the examples. In the examples, all the parts are by weight:

Example 1

Into a 1500 ml. four-necked flask were charged 47.9 parts of acrylamide, 8.8 parts of maleic anhydride, 187.2 parts of styrene, 247.7 parts of butyl acrylate, 245.8 parts of dioxane and 167.2 parts of toluene as solvents, and 3.44 parts of dodecyl mercaptan as a polymerization regulator. To the resulting mixture, a solution prepared by dissolving 9.83 parts of benzoyl peroxide in 78.6 parts of dioxane was gradually added dropwise in 3 hours with stirring at the boiling point of the mixture (about 110° C.), and the reaction was continued for additional 2 hours to obtain a transparent viscous copolymer solution having a non-volatile content of 48%. After lowering the temperature of the solution to 80° C., 19.1 parts of triethylamine and 34.6 parts of paraformaldehyde were added and the methylolation reaction was effected for 3 hours again at the boiling point 96° C. of the mixture. The amount of paraformaldehyde consumed during the methylolation reaction was measured, assuming that one mole of formaldehyde reacted per amide group, to find that, after 2 hours, 83% of the total amide group had been methylolated and, after 3 hours, about 100%.

The copolymer solution thus prepared was properly diluted with xylene and was spray-coated onto a 0.5 mm. thick iron plate polished with said paper, and the coating was baked at 130° C., for 20 minutes to form a clear film of about 35μ. Separately, the copolymer solution itself and a mixture prepared by adding 20 parts of n-butanol to 100 parts of the copolymer solution were respectively stored for one week at 60° C., and were then treated in the same manners as above to obtain clear films. As the result of ability test, each coating came up to the standard of 50 cm. on both surface and back against 1 kg. load of ½″ φ mandrel according to Du Pont-type impact tester, and was excellent in resistance to gasoline.

Example 2

Into the same flask as in Example 1 were charged 53.3 parts of acrylamide, 9.8 parts of maleic anhydride, 265.0 parts of methyl methacrylate, 150.0 parts of ethyl acrylate, 95.6 parts of n-butanol, 334.7 parts of xylene and 8.37 parts of dodecyl mercaptan. The mixture was elevated in temperature with stirring and, at the boiling point (109°–121° C.) of the mixture, a solution prepared by dissolving 4.78 parts of benzoyl peroxide in 47.8 parts of xylene was gradually added dropwise in 3 hours. The reaction was further continued for additional one hour to obtain a colorless transparent viscous copolymer solution having a non-volatile content of 50.8% and an acid value of 8.3. After cooling the solution to room temperature, 27.1 parts of triethylamine and 39.7 parts of paraformaldehyde (85% purity) were added and the mixture was reacted for 24 hours at its boiling point (about 105° C.). The resulting copolymer solution was stable even after being allowed to stand for 3 months at room temperature. 90 parts of the copolymer solution thus stored was mixed with 5 parts of dioctyl phthalate and the mixture was spray-coated onto a 0.5 mm. thick iron plate treated with phosphate and was heated at 130° C. for 20 minutes to obtain a film of about 20μ in thickness. The film had a Sword Rocker hardness of 42, was excellent in flexibility, came up to the standard of 50 cm. on both surface and back against 1 kg. load according to impact test and was prominent in resistance to water, alkali and, particularly, weathering.

Example 3

Into a 1000 ml. four-necked flask, were charged 32.0 parts of acrylamide, 43.0 parts of acrylic acid, 84.0 parts of methyl methacrylate, 142.1 parts of butyl acrylate, 164.7 parts of dioxane and 6.0 parts of dodecyl mercaptan. The mixture was elevated in temperature with stirring and, at the boiling point 110° C. of the mixture, a solution prepared by dissolving 2.26 parts of benzoyl peroxide in 36.2 parts of dioxane was gradually added to the mixture in 90 minutes. The reaction was further continued for additional 3 hours to obtain a copolymer solution. To the copolymer solution, 27.3 parts of 28% ammonia water was gradually added at 60° C. and was uniformly dissolved therein. After diluting with 80 parts of water, the solution was incorporated with 15.8 parts of triethylamine and, at a pH of 7.6, with 36.5 parts of formalin (a 37% aqueous formaldehyde solution). The mixture was reacted at 60° C. for 30 minutes to obtain a light-yellow transparent viscous resin. The resin thus obtained was stable for more than 3 months at room temperature and no change was observed in coating efficiency before and after storage. Namely, a film of said resin which had been applied onto a phosphate-treated iron plate and heat-dried at 140° C. for 30 minutes was excellent in adhesivity and exhibited such water resistance that the film was made somewhat white after immersion in water for 24 hours but the phenomenon was disappeared by allowing the film to stand in air for 20 minutes.

Example 4

Into the same flask as in Example 3, were charged 31.9 parts of acrylamide, 10.8 parts of acrylic acid, 124.8 parts of styrene, 153.6 parts of butyl acrylate, 160.5 parts of dioxane, 109.2 parts of toluene and 2.25 parts of dodecyl mercaptan. The mixture was elevated in temperature with stirring and, at the boiling point (114°–106° C.) of the mixture, a solution prepared by dissolving 6.42 parts of benzoyl peroxide in 51.4 parts of dioxane was gradually added to the mixture in 3 hours. The heating was further continued in a reflux state for additional 3 hours to obtain a transparent viscous copolymer solution having a non-volatile content of 49%. After cooling to about 70° C., the solution was incorporated with 71.2 parts of toluene, 26.5 parts of triethylamine and 50.5 parts of Formit-B (a 40% butanol solution of formaldehyde), and the resulting mixture was again elevated in temperature and was reacted for 3 hours at the boiling point of the mixture (95° C.). The resulting copolymer solution was stable even after being allowed to stand in a thermostat tank at 60° C. The copolymer solution thus treated was spray-coated onto a 0.5 mm. thick iron plate and was heated at 130° C. for 20 minutes to obtain a film with a thickness of about 30μ. The film had a Sword Rocker hardness of 45 and was excellent in both flexibility and adhesivity, and no substantial change in ability was observed even after immersion in gasoline for 24 hours.

Example 5

Into the same flask as in Example 1, were charged 47.9 parts of acrylamide, 191.9 parts of styrene, 253.4 parts of butyl acrylate, 246.6 parts of dioxane, 167.7 parts of toluene and 3.45 parts of dodecyl mercaptan. The resulting mixture was elevated in temperature with stirring and, at the boiling point (113°–105° C.) of the mixture, a solution prepared by dissolving 9.86 parts of benzoyl peroxide in 78.9 parts of dioxane was gradually added to the mixture in a period of 3 hours. The heating at the boiling point was further continued for additional 2 hours to obtain a colorless transparent copolymer solution having a non-volatile content of 47%. After cooling to about 70° C., the solution was incorporated with 23.6 parts of triethylamine, 6.65 parts of phthalic anhydride and 28.5 parts of paraformaldehyde (85% purity), and the resulting mixture was again elevated in temperature to its boiling point (96° C.) and was reacted for 3 hours in a refluxed state. The resulting copolymer solution was spray-coated onto a 0.5 mm. thick iron plate and heated at 130° C. for 20 minutes to form a film having a thickness of about 30μ. The film showed a Sword Rocker hardness of 50, was excellent in flexibility, and, in impact test, came up to the standard of 50 cm. on both surface and back against 1 kg. load. The copolymer was stable even after being allowed to stand for 3 months at room temperature, and a film made from the thus treated solution showed little change in ability as compared with the above-mentioned film.

Example 6

Into the same flask as in Example 3 were charged 32.0 parts of acrylamide, 5.9 parts of maleic anhydride, 124.8 parts of styrene, 165.1 parts of butyl acrylate, 65.6 parts of n-butanol, 196.0 parts of toluene and 1.64 parts of dodecyl mercaptan. The resulting mixture was elevated in temperature with stirring and, at the boiling point of the mixture, a solution prepared by dissolving 6.56 parts of benzoyl peroxide in 65.6 parts of toluene was gradually added to the mixture in 4 hours. Thereafter, the mixture was further reacted in a refluxed state for additional 2 hours to obtain a copolymer solution having a non-volatile content of 49% and a viscosity of $Y>Z$. During the above reaction, the temperature varied from 116° C. to 109° C. The copolymer solution thus obtained was lowered in temperature to below 70° C., incorporated with 18.8 parts of triethylamine and 23.8 parts of paraformaldehyde (85% purity), and was reacted for 3 hours at the boiling point (102° C.) of the mixture. The resulting copolymer solution was stable even after storage for 7 days at 60° C. The resins before and after storage were respectively spray-coated onto a 0.5 mm. thick iron plate and were heated at 130° C. for 20 minutes to form cured films of about 20μ in thickness. Both of the films thus obtained were hard, excellent in flexibility, came up in impact test to the standard of 50 cm. on surface as well as on back against 1 kg. load, and were favorable in resistance to gasoline.

150.0 parts of the above resin was mixed with 7.5 parts of titanium oxide and 7.5 parts of xylene to prepare a white enamel. The enamel was spray-coated onto the aforesaid iron plate and was heated at 140° C. for 30 minutes to form a film. The film showed the following natures:

Sword Rocker hardness—40
Pencil hardness—HB
Gloss (Murakami's glossmeter)—93
Flexibility—2 mm. φ, came up to standard
Impact test (1 kg. load)—50 cm. (both surface and back)

Example 7

Into the same flask as in Example 3, were charged 32.0 parts of acrylamide, 20.5 parts of hydroxyethyl methacrylate (95% purity), 5.9 parts of maleic anhydride, 124.8 parts of styrene, 135.0 parts of ethyl acrylate, 133.2 parts of n-butanol, 103.7 parts of xylene and 3.17 parts of dodecyl mercaptan. The mixture was elevated in temperature with stirring and, at the boiling point (115°–119° C.) of the mixture, a solution comprising 7.93 parts of benzoyl peroxide and 79.3 parts of xylene was gradually added to the mixture in a period of 5 hours. Thereafter the reaction was further continued for additional 1.5 hours to obtain a transparent copolymer solution having a non-volatile content of 48% and a viscosity of $Y \ll Z$. After cooling to about 70° C., the copolymer solution was incorporated with 20.7 parts of triethylamine and 67.5 parts of Formit–B, and the mixture was again elevated in temperature and was reacted at its boiling point (105°–107° C.) for 3 hours to obtain a resin. A cured film formed by subjecting said resin to the same procedures as in Example 1 was hard and was excellent in adhesivity, flexibility and solvent resistance. For reference, the copolymer solution (A) produced according to the above means was compared in properties of resulting cured film with a copolymer solution (B) prepared in the same manners as above except that the triethylamine was not added, to obtain the following results:

| | (A) | (B) |
|---|---|---|
| Pencil hardness | 3H | 2H. |
| Ericsen test | 10.2 mm | 0.8 mm. |
| Impact test (on surface) | 20 cm. (O.K.) | 10 cm. (not O.K.). |
| Solvent resistance (ethanol 50 strokes) | Slightly reduced in gloss. | Softened, considerably reduced in gloss. |

Example 8

Into the same flask as in Example 3, were charged 240 parts of xylene, 30 parts of butyl Cellosolve and 3.6 parts of dodecyl mercaptan. The mixture was elevated in temperature with stirring to its boiling point (136° C.). To the mixture, while refluxing at the boiling point, a mixture comprising 30 parts of butyl Cellosolve, 12 parts of acrylamide, 30 parts of hydroxyethyl methacrylate, 66 parts of styrene, 60 parts of methyl methacrylate, 120 parts of ethyl acrylate, 12 parts of acrylic acid and 6 parts of cumene hydroperoxide was gradually added in a period of 2 hours. The temperature at the time when the addition had been completed was 123° C. After continuing the reaction for additional 2 hours, the mixture was incorporated with 3 parts of cumene hydroperoxide and was further heated for 2 hours, whereby the boiling point was elevated to 134° C., a transparent viscous copolymer solution having a non-volatile content of 50%. The copolymer solution was then cooled to below 80° C. and was incorporated with 25.2 parts of triethylamine and 12 parts of paraformaldehyde, and the mixture was again elevated in temperature and was reacted in a refluxed state at its boiling point 114°–115° C.) for 3 hours. 80 parts of the thus obtained copolymer solution was mixed with 20 parts of the melamine resin "Nikalac MS–11" (a product of Nippon Carbide Co., non-volatile content: about 60%). The mixture was spray-coated on an iron plate or tin-plate sheet and was baked at 130° C. for 20 minutes to form a cured film. The film showed the following results:

Pencil hardness—2H
Flexibility—2 mm. $\phi$ (passed)
Ericsen test—8.4<
Impact test (500 g. load on surface)—30 cm. (passed)
Solvent resistance (treated by dropping toluent on the coating, allowing the coating to stand for 2 minutes and wiping the toluene off)—Unchanged

What is claimed is:

1. A resinous composition which is stable at room temperature and is readily cured by baking, comprising a copolymer, a basic catalyst having a boiling point of up to 135° C. and an acid catalyst, characterized in that the copolymer is comprised of 1 to 30% by weight of amide group-containing polymerizable monomer units and 70 to 99% by weight of monomer units, said copolymer characterized by having at least about 50% of the amide groups thereof having a hydrogen atom replaced by the structure —$CH_2OH$.

2. A resinous composition which is stable at room temperature and is readily cured by baking, comprising a copolymer and a basic catalyst having a boiling point of up to 135° C., characterized in that the copolymer is comprised of 1 to 30% by weight of the amide group-containing polymerizable monomer units, 0.1 to 10% by weight of $\alpha,\beta$-ethylenically unsaturated acid units or its anhydride units, and 60 to 98.9% by weight of monomer units polymerizable therewith, and said copolymer characterized by having at least about 50% of the amide groups thereof having a hydrogen atom replaced by the structure —$CH_2OH$.

3. A resinous composition which is stable at room temperature and is readily cured by baking, comprising a copolymer and a basic catalyst having a boiling point up to 135° C., characterized in that the copolymer is comprising of 1 to 30% by weight of amide group-containing polymerizable monomer units, 5 to 30% by weight of $\alpha,\beta$-ethylenically unsaturated acid units or its anhydride units, and 40 to 96% by weight of monomer units polymerizable therewith, and said copolymer characterized by having at least about 50% of the amide groups thereof having a hydrogen atom replaced by the structure —$CH_2OH$.

4. A resinous composition as claimed in claim 7, wherein the —$CH_2OH$ group-containing copolymer having the carboxy group or acid anhydride group in the side chain reacts with the basic catalyst to form a salt.

5. A resinous composition as claimed in claim 6, wherein the basic catalyst reacts with the acidic curing catalyst to form a salt.

6. A resinous composition which is stable at room temperature and readily cured by baking and which comprises a copolymer, a basic catalyst having a boiling point of up to 135° C. and an acidic curing catalyst or its salt, said copolymer comprising (a) 1 to 30% by weight of units of an amide or amino group-containing ethylenically unsaturated compound, (b) 70 to 99% by weight of units of at least one other ethylenically unsaturated compound, at least about 50% of the amide or amino groups of said copolymer having a hydrogen atom replaced by the group —$CH_2OH$.

7. A resinous composition which is stable at room temperature and readily cured by baking and which comprises a copolymer and a basic catalyst having a boiling point of up to 135° C., said copolymer comprising (a) 1 to 30% by weight of units of an amide or amino group-containing ethylenically unsaturated compound, (b) up to 30% by weight of units of an $\alpha,\beta$-ethylenically unsaturated carboxylic acid or anhydride or its salt and (c) 40 to 99% by weight of units of at least one other ethylenically unsaturated compound, at least about 50% of the amide or amino groups of said copolymer having a hydrogen atom replaced by the group —$CH_2OH$.

8. A method for producing a novel resinous composition as claimed in claim 7, which comprises copolymerizing 1 to 30% by weight of an amide or amino group-containing ethylenically unsaturated compound and 40 to 99% by weight of at least one other ethylenically unsaturated compound, the percentage of the monomers totalling 100%, and reacting the resulting copolymer with 0.5 to 3.0 moles of formaldehyde per molar equivalent of amide or amino groups in the said copolymer in the presence of a basic catalyst having a boiling point of up to 135° C. in a solvent containing less than 6 moles of alcohol per molar equivalent of amide or amino groups in the copolymer until at least about 50% of the amide or amino groups of the copolymer have a hydrogen atom replaced by the group —$CH_2OH$, and incorporating an acidic curing catalyst into the composition.

9. A method according to claim 8, wherein said solvent is substantially free from alcohols.

10. A method for producing a novel resinous composition as claimed in claim 7, which comprises copolymerizing 1 to 30% by weight of an amide or amino group-containing ethylenically unsaturated carboxylic acid or anhydride, and 40 to 99% by weight of at least one other ethylenically unsaturated compound, the percentage of the monomers totalling 100%, and reacting the resulting copolymer with 0.5 to 3.0 moles of formaldehyde per molar equivalent of amide or amino groups in the said copolymer in the presence of a basic catalyst having a boiling point of up to 135° C. in a solvent containing less than 6 moles of alcohol per molar equivalent of amide or amino groups in the copolymer, until at least about 50% of the amide or amino groups of the copolymer have a hydrogen atom replaced by the group —$CH_2OH$.

11. A method according to claim 10, wherein said solvent is substantially free from alcohols.

12. A resinous composition which is stable at room temperature and is readily cured by baking, said composition comprising a coplymer, a basic catalyst having a boiling point of up to 135° C. and an acidic curing catalyst, said copolymer being composed of 1 to 30% by weight of amide or amino group-containing polymerizable monomer units and 70 to 99% by weight of units of monomers other than $\alpha,\beta$-ethylenically unsaturated acids or anhydrides, at least about 50% of the amide or amino groups of said copolymer having a hydrogen atom replaced by the group —CH₂OH.

References Cited

UNITED STATES PATENTS 2,978,437  4/1961  Christenson ____ 260—80.73 XR
3,037,963  6/1962  Christenson.

JOSEPH L. SCHOFER, Primary Examiner
JOHN KIGHT, Assistant Examiner

U.S. Cl. X.R.

117—132; 260—17, 18, 29.1, 33.4, 33.6, 39, 63, 72, 78, 80.7, 80.72, 80.73, 80.81, 834, 836, 837, 849